United States Patent [19]

Strehler et al.

[11] 4,436,897
[45] Mar. 13, 1984

[54] PREPARATION OF POLYCAPROLACTAM WITH AQUEOUS EXTRACT CONTAINING CAPROLACTAM AND CAPROLACTAM OLIGOMERS

[75] Inventors: Hugo Strehler, Frankenthal; Werner Hoerauf, Ludwigshafen; Friedrich Urbanek, Schifferstadt, all of Fed. Rep. of Germany

[73] Assignee: BASF Aktiengesellschaft, Fed. Rep. of Germany

[21] Appl. No.: 410,881

[22] Filed: Aug. 24, 1982

[30] Foreign Application Priority Data

Sep. 2, 1981 [DE] Fed. Rep. of Germany ....... 3134717

[51] Int. Cl.$^3$ .............................................. C08G 69/16
[52] U.S. Cl. ..................................... 528/323; 526/68; 528/312; 528/315
[58] Field of Search ....................... 528/323, 312, 315; 526/68

[56] References Cited

U.S. PATENT DOCUMENTS

| | | | |
|---|---|---|---|
| 3,258,410 | 6/1966 | Temple et al. | 528/323 |
| 3,374,207 | 3/1968 | Ryffel et al. | 528/323 |
| 3,565,866 | 2/1971 | Guenther et al. | 528/323 |
| 4,053,457 | 10/1977 | Cordes | 528/323 |

*Primary Examiner*—Harold D. Anderson
*Attorney, Agent, or Firm*—Keil & Witherspoon

[57] ABSTRACT

An improved process for the preparation of fiber-forming polycaprolactam by polymerizing ε-caprolactam, and an aqueous extract containing ε-caprolactam and caprolactam oligomers, which extract has been obtained by extracting polycaprolactam with water, wherein the aqueous extract contains from 0.1 to 5.0% by weight of oligomers of caprolactam, based on the monomeric caprolactam in the aqueous extract.

2 Claims, No Drawings

PREPARATION OF POLYCAPROLACTAM WITH AQUEOUS EXTRACT CONTAINING CAPROLACTAM AND CAPROLACTAM OLIGOMERS

The present invention relates to a process for the preparation of polycaprolactam by polymerizing ε-caprolactam, wherein an aqueous extract which contains ε-caprolactam and has been obtained by extraction of polycaprolactam with water is additionally used.

In the preparation of caprolactam, polycaprolactam having an extractable content of about 10% is first obtained. This extractable content is extracted from the monomer-containing polycaprolactam in a conventional manner with water. The resulting aqueous solution is usually evaporated and worked up again to caprolactam. Attempts have also previously been made merely to concentrate the aqueous extract and to re-use the concentrate as the starting material, together with ε-caprolactam, in the polymerization to polycaprolactam, (cf. German Laid-Open Applications DOS No. 2,501,348 and DOS No. 2,732,228). However, once this operation has been repeated several times, the properties of the polycaprolactam become modified to the extent that the quality of the product no longer fulfills the requirements for the production of filaments and fibers.

It is thus an object of the present invention to provide a process for recycling aqueous extracts from the extraction of polycaprolactam to the polymerization in such a manner that the polycaprolactam produced is of adequate quality for the production of filaments and fibers in spite of repeated recycling of the aqueous extract.

We have found that this object is achieved by a process for the preparation of polycaprolactam by polymerizing ε-caprolactam in which an aqueous extract which contains ε-caprolactam and has been obtained by extraction of polycaprolactam with water is additionally used, wherein the aqueous extract contains less than 5.0% by weight of oligomers of caprolactam, based on the monomeric caprolactam contained in the aqueous extract.

The novel process has the advantage that, in spite of repeated recycling of the aqueous extract, the polycaprolactam produced fulfills the requirements for the production of filaments and fibers.

The polymerization of caprolactam is preferably carried out continuously, for example in vertical reaction zones at from 240° to 280° C. German Published Application DAS No. 1,495,198, for example, describes a particularly suitable process which enables up to 15% of water to be fed into the reaction zone section widened at the top. The aqueous extract originating from extraction of polycaprolactam is fed into the top of the reaction zone together with monomeric caprolactam, and the water is vaporized and is removed at the rate at which it is added. The resulting polycaprolactam is extracted with water in turn and the extract is recycled to the top of the polymerization zone.

An essential feature of the invention is that the aqueous extract contains less than 5.0% by weight, eg. from 0.1 to 5.0% by weight, of oligomers of caprolactam, based on the monomeric caprolactam contained in the aqueous extract. Oligomers as a rule have a degree of polymerization n of from 2 to 9. In particular, they contain dimeric and trimeric cyclic oligomers. The aqueous extract used advantageously contains less than 4.0% by weight, eg. from 0.1 to 4.0% by weight, of dimeric and trimeric cyclic oligomers.

Suitable aqueous extracts having a low oligomer content can be obtained, for example, by concentrating the aqueous extract and separating off the sparingly soluble oligomers precipitated, but partial extraction of polycaprolactam is preferred. In this procedure, polycaprolactam is extracted in countercurrent with from 0.2 to 0.8 metric tons of water per metric ton of polycaprolactam at from 80° to 120° C. in a first stage. The caprolactam extracted is substantially monomeric, and the more sparingly soluble oligomers remain behind in the polycaprolactam. The resulting aqueous extract as a rule contains from 15 to 25% by weight of monomeric caprolactam and from 1 to 5.0% by weight of oligomers, based on caprolactam. The oligomers which remain in the polycaprolactam are then extracted at from 80° to 120° C. in a second stage, and the extract is used elsewhere or worked up. It is also possible to combine the two extraction zones to a single unit, as disclosed in, for example, German Published Application DAS No. 1,209,293. In this case, the polycaprolactam is extracted in countercurrent with water, the extract having a high oligomer content is removed at about the middle of the extraction zone, and an extract having a lower oligomer content and a caprolactam content of about 22% by weight is obtained at the top of the extraction zone.

The resulting aqueous extract having a low oligomer content and a caprolactam content of from 15 to 25% by weight can be fed directly to the polymerization. Advantageously, however, it is preconcentrated, for example to from 50 to 90% by weight of caprolactam. German Laid-Open Application DOS No. 2,501,348 describes a suitable process for this concentration. The extract is advantageously concentrated to such an extent that the water content does not exceed 15% by weight during recycling into the top of the polymerization zone.

The amount of oligomers fed to the polymerization with the aqueous extract is advantageously <0.6% by weight, based on the amount of fresh caprolactam and the amount of caprolactam fed with the aqueous extract.

The polycaprolactam obtained by the process according to the invention can be used for the production of filaments and fibers.

The Examples which follow illustrate the process according to the invention.

COMPARATIVE EXAMPLE 1.7 metric tons per hour of polycaprolactam containing 10% by weight of monomers and 2% by weight of oligomers are extracted in countercurrent with 1,500 l per hour of demineralized water at 100° C. The extract contains 11.4% by weight of caprolactam and oligomers thereof, with an oligomer content of 14% by weight, based on the caprolactam. This extract is polymerized with about 1,700 kg/hour of fresh caprolactam, and the resulting polycaprolactam is extracted as described above and then dried, this procedure being repeated continuously. After five passes, a polycaprolactam is obtained which has a relative viscosity of 2.7 and a residual extract content of 0.6% by weight, the amount of oligomers being as follows:
  dimeric: 22%
  trimeric: 24%
  tetrameric: 22% pentameric: 16%
hexameric: 4%
heptameric: 2%

The polycaprolactam is spun to a multifilament consisting of 6 filaments having together 44 denier and the filaments are drawn. The drawing yield is 58%. 1,654 knots were counted per 100 km of filament length.

EXAMPLE 1.7 metric tons per hour of polycaprolactam containing 10% by weight of caprolactam and 2% by weight of oligomers are extracted in countercurrent with 700 l per hour of demineralized water at 100° C. in a first stage. The extract contains 18% by weight of caprolactam and 0.7% by weight of oligomers, ie. 3.8% by weight of oligomers, based on the caprolactam content.

The extract containing about 2% by weight of caprolactam and about 2.2% by weight of oligomers which is obtained during subsequent extraction with 800 l/hour of water is worked up elsewhere.

The extract from the first stage is polymerized with about 1,700 kg/hour of fresh caprolactam and the polycaprolactam is extracted as described above and dried, this procedure being repeated continuously. After five passes, a polycaprolactam is obtained which has a relative viscosity of 2.7 and a residual extract content of 0.6% by weight, the amount of oligomers being as follows:

dimeric: 7%
trimeric: 21%
tetrameric: 22%
pentameric: 16%
hexameric: 4%
heptameric: 2%

The polycaprolactam is spun to a multifilament consisting of 6 filaments having together 44 denier, and the filaments are drawn. The drawing yield is 98%. 48 knots can be counted per 100 km of filament length.

We claim:

1. A process for the preparation of fiber-forming polycaprolactam comprising polymerizing a composition comprising $\epsilon$-caprolactam and an aqueous extract containing caprolactam and caprolactam oligomers, which extract has been obtained by extracting polycaprolactam with water, wherein such aqueous extract contains from 0.1 to 5.0% by weight of oligomers of caprolactam, based on teh monomeric caprolactam contained in the aqueous extract.

2. A process as claimed in claim 1, wherein the extract has been obtained by partial extraction of polycaprolactam.

* * * * *